(12) United States Patent
Bernon-Enjalbert et al.

(10) Patent No.: US 9,425,692 B2
(45) Date of Patent: Aug. 23, 2016

(54) DC TO DC CONVERTER AND METHOD TO TRANSITION THE DC TO DC CONVERTER FROM A BUCK MODE TO A BOOST MODE

(75) Inventors: Valerie Bernon-Enjalbert, Fonsorbes (FR); Franck Galtie, Plaisance du Touch (FR); Philippe Goyhenetche, Fonsorbes (FR)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 14/372,765

(22) PCT Filed: Jan. 20, 2012

(86) PCT No.: PCT/IB2012/000359
§ 371 (c)(1),
(2), (4) Date: Jul. 17, 2014

(87) PCT Pub. No.: WO2013/108066
PCT Pub. Date: Jul. 25, 2013

(65) Prior Publication Data
US 2015/0002116 A1 Jan. 1, 2015

(51) Int. Cl.
*H02M 3/158* (2006.01)
*H02M 1/00* (2006.01)

(52) U.S. Cl.
CPC ... *H02M 3/1582* (2013.01); *H02M 2001/0022* (2013.01)

(58) Field of Classification Search
CPC .......................... H02M 3/158; H02M 3/1582
See application file for complete search history.

(56) References Cited

U.S. PATENT DOCUMENTS

| 6,037,755 | A  | 3/2000  | Mao et al.   |
|-----------|----|---------|--------------|
| 7,292,016 | B2 | 11/2007 | Wake         |
| 7,432,689 | B2 | 10/2008 | Miller et al.|
| 7,570,033 | B1 | 8/2009  | Ju           |
| 8,446,133 | B2 | 5/2013  | Kuan et al.  |
| 8,723,496 | B2 | 5/2014  | Sun et al.   |

(Continued)

FOREIGN PATENT DOCUMENTS

| CN | 1578084 A    | 2/2005  |
| CN | 101924469 A  | 12/2010 |

(Continued)

OTHER PUBLICATIONS

International Search Report and Written Opinion correlating to PCT/IB2012/000359 dated Nov. 19, 2012.

(Continued)

*Primary Examiner* — Timothy J Dole
*Assistant Examiner* — Ishrat Jamali
(74) *Attorney, Agent, or Firm* — Charlene R. Jacobsen

(57) ABSTRACT

A DC to DC converter including a buck converter, a boost converter, and a control unit, wherein the control unit is arranged to calculate an error voltage of the buck converter Verr_buck based on a feedback output voltage Vout_FB of the DC to DC converter and a reference voltage of the buck converter Vref_buck, and wherein the control unit is arranged to calculate an error voltage of the boost converter Verr_boost based on the feedback output voltage Vout_FB of the DC to DC converter and a reference voltage of the boost converter Vref_boost, wherein the reference voltage of the boost converter Vref_boost is shifted by an offset Voffset as compared to the reference voltage of the buck converter Vref_buck.

18 Claims, 7 Drawing Sheets

(56) References Cited

U.S. PATENT DOCUMENTS

| | | | |
|---|---|---|---|
| 2006/0043951 A1* | 3/2006 | Oswald | H02M 3/156 323/282 |
| 2009/0072368 A1* | 3/2009 | Hu | H01L 24/73 257/676 |
| 2009/0108824 A1* | 4/2009 | Chen | H02M 3/156 323/285 |
| 2009/0295343 A1 | 12/2009 | Chiu | |
| 2012/0001610 A1 | 1/2012 | Klein | |
| 2012/0098510 A1 | 4/2012 | Galtie et al. | |
| 2014/0152272 A1* | 6/2014 | Bazzani | H02M 3/1582 323/234 |

FOREIGN PATENT DOCUMENTS

| | | |
|---|---|---|
| CN | 102122888 A | 7/2011 |
| DE | 2323482 A1 | 11/1974 |
| DE | 10054339 A1 | 5/2002 |

OTHER PUBLICATIONS

Office Action counterpart application CN 201280067578.8 (Feb. 1, 2016).

\* cited by examiner

DC TO DC CONVERTER AND METHOD TO TRANSITION THE DC TO DC CONVERTER FROM A BUCK MODE TO A BOOST MODE

FIELD OF THE INVENTION

This invention relates to a DC to DC converter and a method to operate a DC to DC converter.

BACKGROUND OF THE INVENTION

In the automotive market, DC to DC converters must operate through a wide input voltage range defined by a normal variation of the supplied input voltage as well as by some transient voltages. Such a transient voltage may be, for example, a cranking pulse, i.e., a huge voltage drop that can happen when certain events occur simultaneously, for example, a discharged battery, low temperatures, and the driver attempting to start the car.

A DC to DC converter may be used to compensate such a cranking pulse and may additionally provide an adapted voltage level to connected electronic devices. Such a DC to DC converter may transform an input voltage $V_{in}$ to an output voltage $V_{out}$, wherein the output voltage $V_{out}$ may be higher or lower than the input voltage $V_{in}$. A DC to DC converter capable of regulating an output voltage regardless of the input voltage $V_{in}$ is called a buck-boost DC to DC converter. The buck-boost DC to DC converter comprises a buck converter that converts an input voltage $V_{in}$ to a lower output voltage $V_{out}$ and a boost converter that converts an input voltage $V_{in}$ to a higher output voltage $V_{out}$. The buck-boost converter may be called non-inverting when the sign of the input voltage $V_{in}$ is maintained.

The buck-boost DC to DC converter has too provide a constant output voltage $V_{out}$. Therefore, a transition between an operation of the buck converter (buck mode) and an operation of the boost converter (boost mode) is necessary when the input voltage $V_{in}$ drops from a starting value that is higher than the desired output voltage $V_{out}$ to a final value that is lower than the desired output voltage level $V_{out}$. This transition from buck mode to boost mode and vice versa must be managed smoothly and efficiently.

SUMMARY OF THE INVENTION

The present invention provides a DC to DC converter and a method to operate a DC to DC converter as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present, invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Although the definition of term hereinafter should not be construed as limiting, the term as used are understood to comprise at least the following.

In the context of this specification, the term "switching element" may be used for any electronic element, for example, a generic switch or a transistor that can be changed in its state between "on" and "off".

The term "on" in connection with the switching element may describe the used electronic element in its closed or conducting state. Further, the term "off" in connection with the switching element may describe the used electronic element in its open or isolating state.

Figure 1:
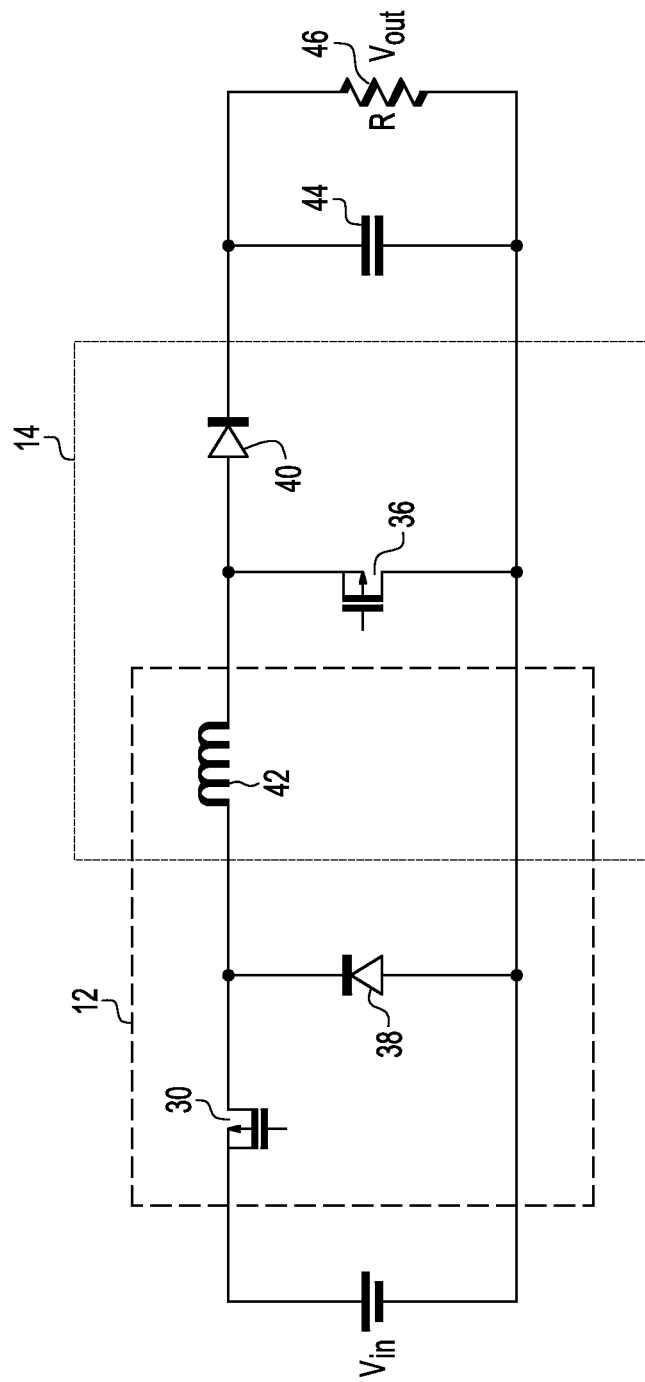
FIG. 1 schematically shows a circuit diagram of a first example of a DC to DC converter.

Referring to FIG. 1, a circuit diagram of a first example of a DC to DC converter 10 is schematically shown. The DC to DC converter 10 according to FIG. 1 may comprise a buck converter 12 and a boost converter 14. The DC to DC converter 10 may be supplied with an input voltage $V_{in}$. The input voltage $V_{in}$ may be converted to an output voltage $V_{out}$ by the DC to DC converter 10. An output of the DC to DC converter 10 may be connected with a load 46, and an optional capacitor 44 may be provided parallel to the load 46 as part of the DC to DC converter 10. A capacity of the capacitor 44 may be chosen with respect to requirements of the load 46. For example, the capacity may be increased to minimize output voltage ripples. When the input voltage $V_{in}$ is higher than the desired output voltage $V_{out}$, the buck converter 12 of the DC to DC converter 10 may be active to reduce the input voltage $V_{in}$. This operating mode may be called "buck mode". When the input voltage $V_{in}$ is lower than the desired output voltage $V_{out}$, the boost converter 14 of the DC to DC converter 10 may be active to increase the input voltage $V_{in}$. This operating mode may be called "boost mode". The functional principals of the buck converter 12 and the boost converter 14 are apparent to a person skilled in the art and will not be explained here in any further detail. Since the DC to DC converter 10 comprises the buck converter 12 and the boost converter 14, it may be called a buck-boost DC to DC converter.

In the example of FIG. 1, the buck converter 12 may comprise a HS (high side) diode 38, a HS switching element 30, and an inductor 42. The boost converter 14 may comprise a LS (low side) diode 40, a LS switching element 36, and the inductor 42. Thus, the inductor 42 may be commonly used by the buck converter 12 and the boost converter 14. The HS switching element 30 and the LS switching element 36 may be triggered by a control unit not shown in FIG. 1.

The HS switching element 30 and a LS switching element 36 may be, for example, metal oxide semiconductor field-effect transistors (MOSFETs). However, any other electronic element that is capable of being used as a switching element may be used. Further, it may be possible to replace the HS diode 38 and the LS diode 40 by a different electronic element that may fulfil the same function, for example, an appropriate triggered transistor. The input voltage $V_{in}$ may be provided by a battery. The DC to DC converter 10 shown in FIG. 1 may be called non-inverting because it maintains the sign of the input voltage $V_{in}$.

Figure 2:
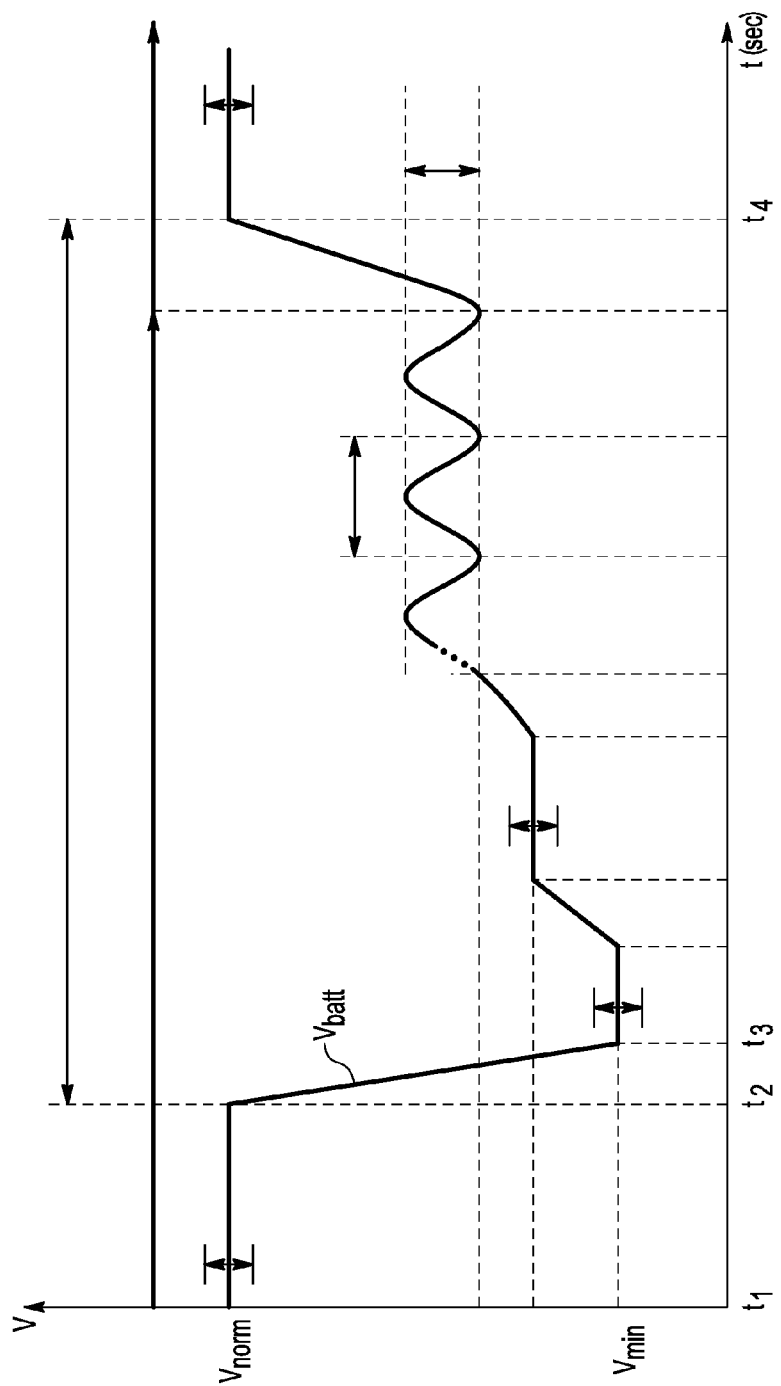
FIG. 2 schematically shows an example of a cranking pulse.

Referring now to FIG. 2, an example of a cranking pulse is schematically shown as a function of time. The term "cranking pulse" describes a high voltage drop that may occur with a discharged battery when the driver attempts to start up the car. Initially, at a time $t_1$ the battery voltage $V_{batt}$ may have its normal value $V_{norm}$. At a time $t_2$, the driver may attempt to start the car. As a result, the battery voltage $V_{batt}$ may drop to a low value $V_{min}$ within the short time interval $t_3$-$t_2$ before it returns to $V_{norm}$ at a time $t_4$. However, it is very important to keep any supply voltage provided to automotive electronics connected to the battery at a certain stable voltage level to avoid damage to the electronics and unpredictable data processing. The desired supply voltage for the automotive electronics may lie between $V_{norm}$ and $V_{min}$. Thus, it may be necessary to convert the supply voltage provided by the battery with a buck-boost DC to DC converter, wherein a transition between a buck mode and a boost mode is necessary when the supply voltage provided by the battery equals the desired supply voltage for the automotive electronics. This transition must be smooth without any voltage or current peaks at the output of the DC to DC converter.

Figure 3:
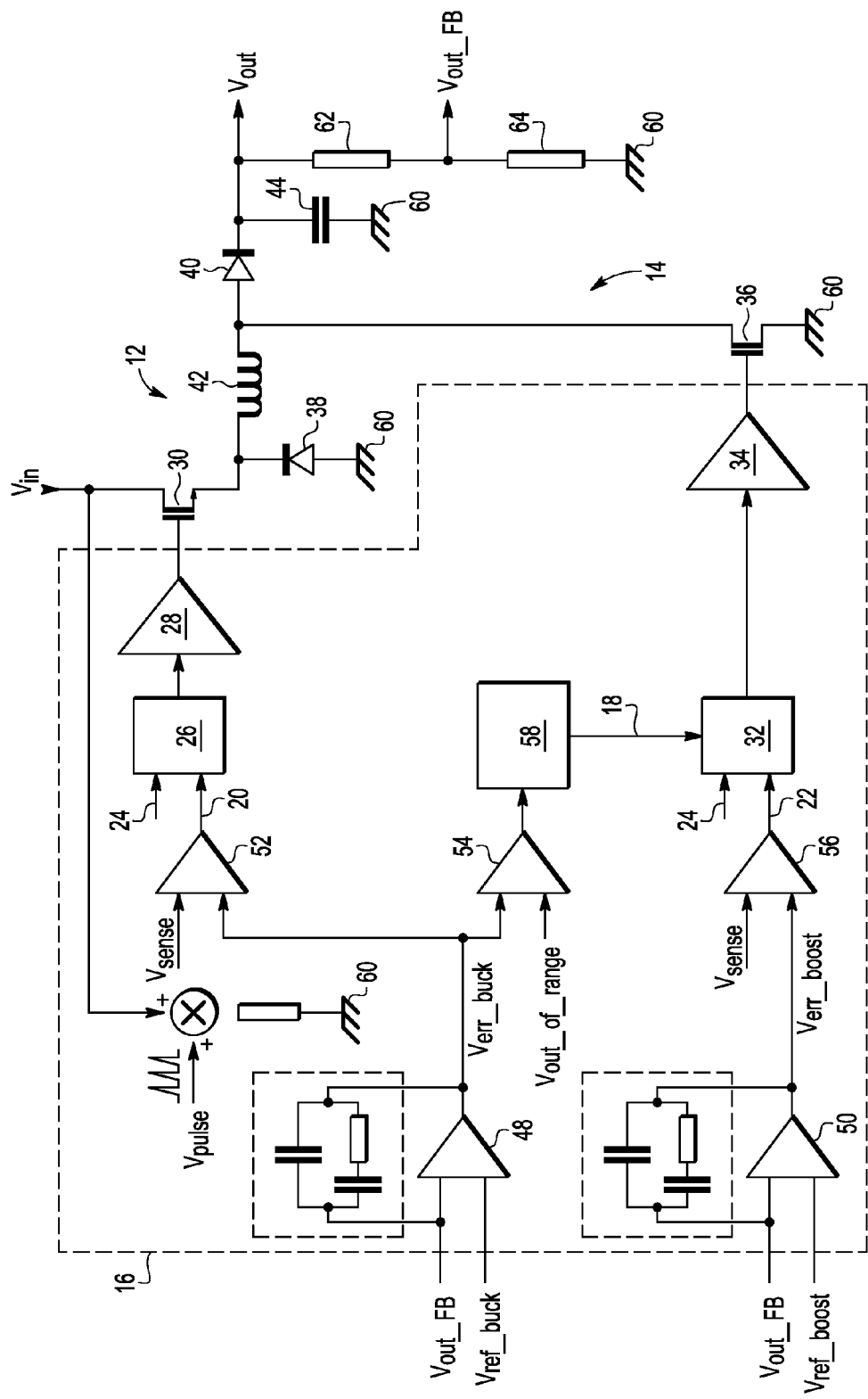
FIG. 3 schematically shows a further circuit diagram of a second example of a DC to DC converter.

Referring to FIG. 3, a further circuit diagram of a second example of a DC to DC converter 10 is schematically shown. The DC to DC converter 10 according to FIG. 2 is a buck-boost converter and comprises a buck converter 12, a boost converter 14, and a control unit 16. The basic set-ups of the buck converter 12 and the boost converter 14 as shown in FIG. 3 correspond to the buck converter 12 and the boost converter 14 already known from FIG. 1. However, the circuits are closed by connecting the LS switching element 36, the HS diode 38, and the capacitor 44 to a ground 60.

The control unit 16 may be arranged to trigger the HS switching element 30 and the LS switching element 36. As in FIG. 1, the HS switching element 30 and the LS switching element 36 may be MOSFETs. However, the use of different electronic elements as HS switching element 30 and LS switching element 36 are apparent to a person skilled in the art.

The control unit 16 may comprise a first error amplifier 48, a second error amplifier 50, a first comparator 52, a second comparator 54, a third comparator 56, a HS control circuit 26, a HS driver circuit 28, a LS control circuit 32, and a LS driver circuit 34. Additionally, the control unit 16 may optionally comprise a filter 58. The first error amplifier 48, the first comparator 52, the HS control circuit 26, and the HS driver circuit 32 may be used to trigger the HS switching element 30. The second error amplifier 50, the second comparator 54, the third comparator 56, the LS control circuit 32, and the LS driver circuit 34 may be used to trigger the LS switching element 36. The functionality of the control unit 16 will be explained in the following.

A feedback output voltage $V_{out\_FB}$ may be provided to the first error amplifier 48 and the second error amplifier 50 of the control unit 16. The feedback output voltage $V_{out\_FB}$ may be, for example, the output voltage $V_{out}$ of the DC to DC converter 10 scaled by a first resistor 62 and a second resistor 64. The first error amplifier 48 and the second error amplifier 50 may be, for example, operational amplifiers with a differential input and a single-ended output. The feedback output voltage $V_{out\_FB}$ and a reference voltage of the buck converter $V_{ref\_buck}$ may be used as input signals for the first error amplifier 48. The first error amplifier 48 provides an error voltage of the buck converter $V_{err\_buck}$ at its output. The output signal of the first error amplifier 48 may be used as a negative feedback signal for the feedback output voltage $V_{out\_FB}$ at the appropriate input of the first error amplifier 48.

Similarly, the feedback output voltage $V_{out\_FB}$ and a reference voltage of the boost converter $V_{ref\_boost}$ may be used as differential input signals for the second error amplifier 50. The second error amplifier 50 provides an error voltage of the boost converter $V_{err\_boost}$ based on the differential input signals. The output signal of the second error amplifier 50 may be used as a negative feedback signal for the feedback output voltage $V_{out\_FB}$ at the appropriate input of the second error amplifier 50. Thus, the control unit 16 is arranged to calculate an error voltage of the buck converter $V_{err\_buck}$ based on a feedback output voltage $V_{out\_FB}$ of the DC to DC converter 10 and a reference voltage of the buck converter $V_{ref\_buck}$. Further, the control unit 16 is arranged to calculate an error voltage of the boost converter $V_{err\_boost}$ based on the feedback output voltage $V_{out\_FB}$ of the DC to DC converter 10 and the reference voltage of the boost converter $V_{ref\_boost}$. The reference voltage of the boost converter $V_{ref\_boost}$ may be shifted by an offset $V_{offset}$ as compared to the reference signal of the buck converter $V_{ref\_buck}$. The reference voltage of the buck converter $V_{ref\_buck}$ may define the desired output voltage $V_{out}$ of the DC to DC converter 10 when operating in buck mode. Analogously, the reference voltage of the boost converter $V_{ref\_boost}$ may define the desired output voltage $V_{out}$ of the DC to DC converter 10 when operating in boost mode. Due to the offset $V_{offset}$, the output voltage $V_{out}$ of the DC to DC converter 10 may change from $V_{ref\_buck}$ to $V_{ref\_boost}$ when changing from buck mode to boost mode and vice versa. The reference voltage of the buck converter $V_{ref\_buck}$ may usually be larger than the reference voltage of the boost converter $V_{ref\_boost}$. In this case, the difference between the reference voltage of the buck converter $V_{ref\_buck}$ and the reference voltage of the boost converter $V_{ref\_boost}$ may generate a hysteresis around the transition between buck mode and boost mode. The hysteresis may avoid quick oscillations of the DC to DC converter 10 between buck mode and boost mode.

When the input voltage $V_{in}$ of the DC to DC converter 10 lies between the reference voltage of the buck converter $V_{ref\_buck}$ and the reference voltage of the boost converter $V_{ref\_boost}$, the HS switching element 30 of the buck converter 12 is always on (i.e., conducting or closed), and the LS switching element 36 is always off (i.e., isolating or open). Therefore, the efficiency of the DC to DC converter 10 is increased because the HS switching element 30 and the LS switching element 36 are not triggered in this region and do not cause switching losses. Additionally, the output voltage $V_{out}$ of the DC to DC converter 10 may equal its input voltage $V_{in}$ and input current without additional ripples or peaks.

The error voltage of the buck converter $V_{err\_buck}$ may be provided to the first comparator 52 together with a time-dependent sensing voltage $V_{sens}$. The time-dependent sensing voltage $V_{sens}$ may be generated based on a pulsating voltage $V_{pulse}$ and a further voltage, for example, by adding the pulsating voltage $V_{pulse}$ to the further voltage. The further voltage may be, for example, a voltage that represents the input current of the DC to DC converter 10. The DC to DC converter 10 may, for example, operate in a current mode. A current pattern, i.e., a current ramp, may be sensed at the HS switching element 30. The sensed current pattern may be transformed to a voltage pattern by a resistor, and the resulting voltage pattern that may correspond to the current pattern may be the pulsating voltage $V_{pulse}$. The pulsating voltage $V_{pulse}$ may be, for example, a sawtooth voltage or a triangle voltage. The pulsating voltage $V_{pulse}$ may be called a "slope compensation" that allows for the stability of the DC to DC converter 10 at all possible duty cycles between 0 and 100%. The first comparator 52 may provide a first PWM signal 20 at its output. Thus, the control unit 16 may be arranged to calculate the first PWM signal 20 by comparing the time-dependent sensing voltage $V_{sens}$ with the error voltage of the buck converter $V_{err\_buck}$. The first PWM signal 20 may substantially define a duty-cycle of the buck converter 12. The shape of the first PWM signal 20 may be, for example, rectangular. The HS control circuit 26 may be used to generate an input signal for the HS driver circuit 28 that may trigger the HS switching element 30 of the buck converter 12. The first PWM signal 20 and a clock signal 24 may be used as input signals for the HS control circuit 26. The HS control circuit 26 may be, for example, a flip-flop which has the first PWM signal 20 and the clock signal 24 as input signals.

A second PWM signal 22 may be provided by the second comparator 54 which has the error voltage of the boost converter $V_{err\_boost}$ and the time-dependent sensing voltage $V_{sens}$ as input signals. Thus, the control unit 16 may be arranged to calculate the second PWM signal 22 by comparing the time-dependent sensing voltage $V_{sens}$ with the error voltage of the boost converter $V_{err\_boost}$. Just like the first PWM signal 20, the second PWM signal 22 may be, for example, rectangular. The second PWM signal 22 and the clock signal 24 may be used as input signals for the LS control circuit 32 that provides an output signal to a LS driver circuit 34. The LS driver circuit 34 may trigger the LS switching element 36 of the boost converter 14. An additional control signal 18 may optionally be provided to the LS control circuit 32. The LS control circuit 32 may be, for example, a flip-flop. The control unit 16 may be described as a current mode PWM controller when the further voltage represents the input current of the DC to DC controller 10.

The control signal 18 may be used as an additional input signal that overwrites an output signal of the LS control circuit 32 which is generated on the basis of the second PWM signal 22 and the clock signal 24. Thus, the control signal 18 may activate or deactivate (i.e., engage or disengage) the boost converter 14. The second PWM signal 22 may substantially represent a duty-cycle of the boost converter 14. In particular, the second PWM signal 22 may define when the LS switching element 36 is in its open state (or conducting) or in its closed state (off of isolating). The control signal 18 may be generated directly or indirectly by the second comparator 54 that uses the error voltage of the buck converter $V_{err\_buck}$ and a threshold voltage $V_{out\_of\_range}$ as input signals. The filter 58 may be optionally used for smoothing the generated control signal 18.

As mentioned before, the control signal 18 may be used to engage or disengage the boost converter 14. When the error voltage of the buck converter $V_{err\_buck}$ is higher than the threshold voltage $V_{out\_of\_range}$, the boost converter 14 may be engaged. When the error voltage of the buck converter $V_{err\_buck}$ is lower than the threshold voltage $V_{out\_of\_range}$, the boost converter 14 may be disengaged. Thus, the control unit 16 may be arranged to calculate the control signal 18 to engage and disengage the boost converter 14 based on the error voltage of the buck converter $V_{err\_buck}$. The buck converter 12 is the main operating circuit, and the boost converter 14 can operate as an optional auxiliary circuit when the input voltage $V_{in}$ of the DC to DC converter 10 is too low.

The reference voltage of the buck converter $V_{ref\_buck}$ may define the desired output voltage $V_{out}$ of the buck converter 12 in buck mode. Thus, the error voltage of the buck converter $V_{err\_buck}$ may decrease when the feedback output voltage $V_{out\_FB}$ of the DC to DC converter 10 increases. For example, the error voltage of the buck converter $V_{err\_buck}$ may tend to 0 when the feedback output voltage $V_{out\_FB}$ of the DC to DC converter 10 is higher than the reference voltage of the buck converter $V_{ref\_buck}$, and the error voltage of the buck converter $V_{err\_buck}$ may reach an upper peak value of the time-dependent sensing voltage $V_{sens}$ when the feedback output voltage $V_{out\_FB}$ of the DC to DC converter 10 equals the reference voltage of the buck converter $V_{ref\_buck}$. In the same way, the error voltage of the boost converter $V_{err\_boost}$ may define the desired output voltage $V_{out}$ of the boost converter 14 in boost mode, and the error voltage of the boost converter $V_{ref\_boost}$ may tend to 0 or fall below a lower peak value of the time-dependent sensing voltage $V_{sens}$ when the reference voltage of the boost converter $V_{ref\_boost}$ equals the feedback output voltage $V_{out\_FB}$ of the DC to DC converter 10.

The duty-cycle of the buck converter 12 increases when the error voltage of the buck converter $V_{err\_buck}$ increases. The threshold voltage $V_{out\_of\_range}$ may be chosen such that the duty-cycle of the buck converter 12 reaches 100 percent before the error voltage of the buck converter $V_{err\_buck}$ becomes larger than the threshold voltage $V_{out\_of\_range}$. Additionally, the error voltage of the boost converter $V_{err\_boost}$ may be chosen such that the duty-cycle of the boost converter 14 is larger than 0 percent when the boost converter 14 is engaged by the control signal 18. This means that the LS switching element 36 of the boost converter 14 may be periodically triggered when the boost converter 14 is engaged and that a small variation of the input voltage $V_{in}$ does not significantly change the duty-cycle when the boost converter is engaged. This may avoid the generation of peaks in the output voltage $V_{out}$ and the output current during the transition from buck mode to boost mode and vice versa. Thus, the electromagnetic compatibility of the DC to DC converter 10 is good.

It may be possible to use the control signal 18 as an additional input signal for the HS control circuit 26. In this case, the control signal 18 may be used as a master signal that overwrites the normal output signal of the HS control circuit 26 generated on the basis of the first PWM signal 20 and the clock signal 24. Thus, the control signal 18 may be used to permanently set the HS switching element 30 on. This may secure that the buck converter 12 is deactivated when the boost converter is activated. Using the control signal 18 as an additional input signal for the HS control circuit 26 may be useful when the threshold voltage $V_{out\_of\_range}$ is chosen such that the duty-cycle of the buck converter 12 does not reach 100 percent before the error voltage of the buck converter $V_{err\_buck}$ becomes larger than the threshold voltage $V_{out\_of\_range}$.

Figure 11:
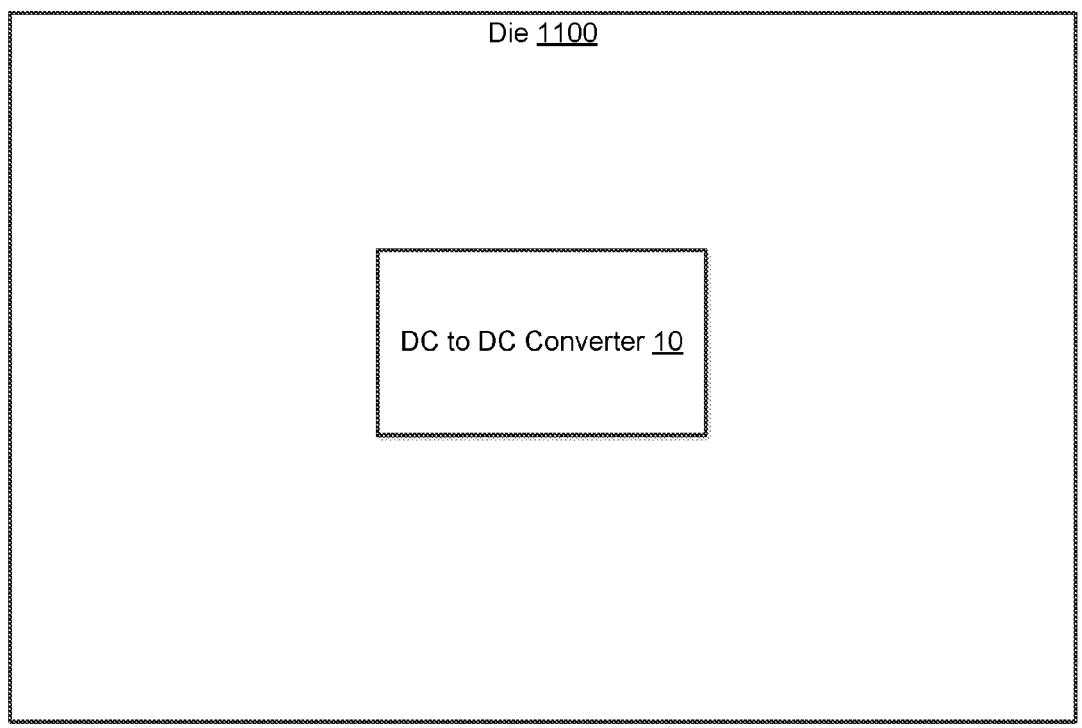
FIG. 11 shows a diagram of a DC to DC converter implemented on a single die.

The DC to DC converter shown in FIG. 3 may be designed as a system on a die, wherein at least parts of the DC to DC converter, for example, the buck converter 12, the boost converter 14, or the control unit 16, are implemented on a single die 1100 as shown in FIG. 11. The single die may comprise, for example, a silicon substrate.

Figure 4:
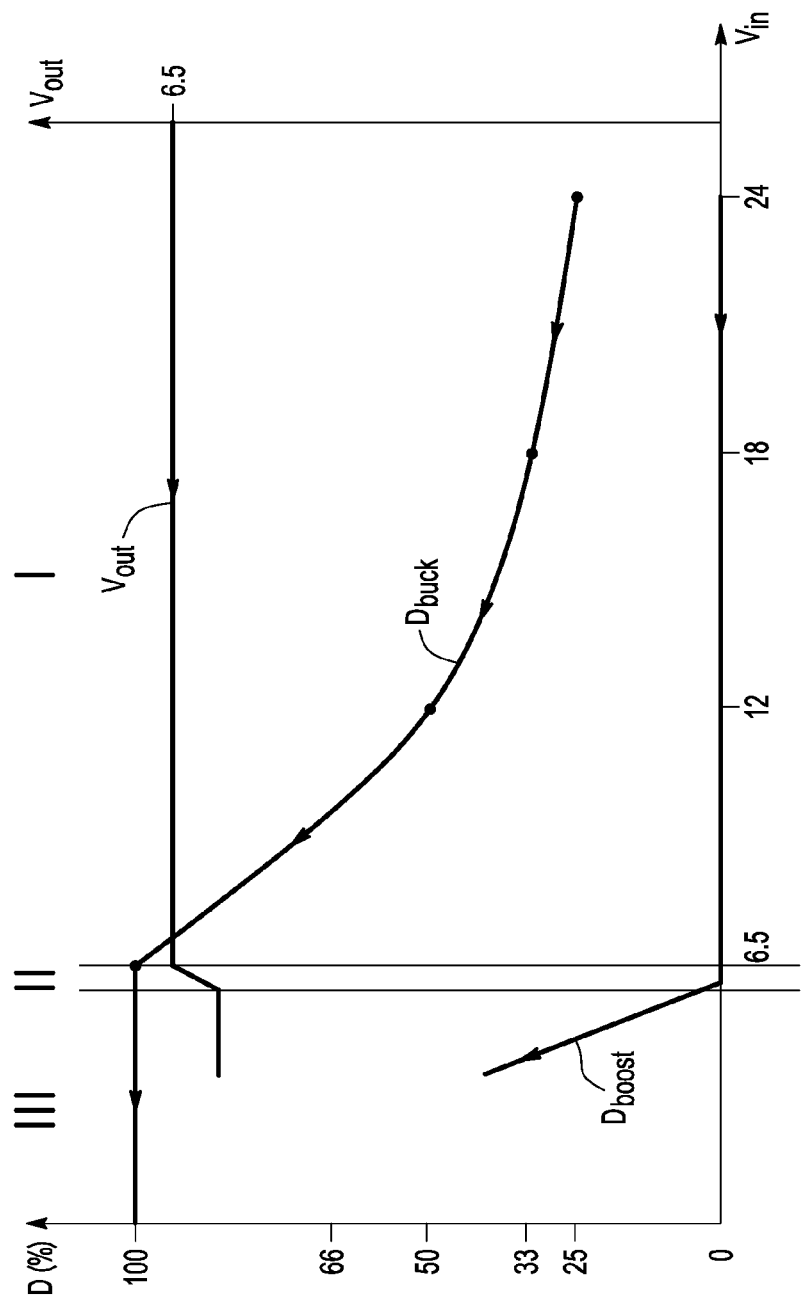
FIG. 4 schematically shows a diagram of an example of duty-cycles of a DC to DC converter and a corresponding output voltage $V_{out}$ of this DC to DC converter as a function of an input voltage $V_{in}$.

Referring now to FIG. 4, a diagram of an example of duty-cycles of a DC to DC converter and a corresponding output voltage $V_{out}$ of this DC to DC converter is shown as a function of the input voltage $V_{in}$. The diagram is divided in three different regions as will be explained in the following. It can be seen from FIG. 4 that the desired output voltage $V_{out}$ of the buck converter may be about 6.5 volt. In region I, the duty-cycle of the buck converter $D_{buck}$ increases when the input voltage $V_{in}$ of the DC to DC converter decreases. For example, the duty-cycle of the buck converter $D_{buck}$ may reach 100 percent at an input voltage $V_{in}$ of approximately 6.5 volt (i.e., the desired output voltage of the buck converter in this example). The duty-cycle of the boost converter $D_{boost}$ is 0 in region I. Therefore, the DC to DC converter is in buck mode. A duty-cycle of the buck converter $D_{buck}$ of 100 percent means that its HS switching element known from FIGS. 1 and 3 is permanently on. When the input voltage $V_{in}$ of the DC to DC converter further decreases, the error voltage of the buck converter $V_{err\_buck}$ increases further, but the duty-cycle of the buck converter $D_{buck}$ has already reached its maximum value. This leads to a decreasing output voltage $V_{out}$ of the DC to DC converter 10 in region II. The duty-cycle of the boost converter $D_{boost}$ may reach a value larger than 0 in region II. However, the boost converter may not yet be engaged because the error voltage of the buck converter $V_{err\_buck}$ has not yet reached the value of the threshold voltage $V_{out\_of\_range}$ and the DC to DC converter stays in buck mode. The error voltage of the buck converter $V_{err\_buck}$ may reach the threshold voltage $V_{out\_of\_range}$ at the beginning of region III, and the buck converter may engage the boost converter by generating the control signal. The DC to DC converter switches to boost mode.

Due to the appropriate offset $V_{offset}$ between the reference voltage of the buck converter $V_{ref\_buck}$ and the reference voltage of the boost converter $V_{ref\_boost}$ in connection with the generation of the control signal, the duty-cycle of the boost converter $D_{boost}$ does not start with 0 percent when the boost converter is engaged with entrance of region III. However, due to the offset $V_{offset}$, the output voltage, $V_{out}$ of the DC to DC converter changes from the reference value of the buck converter $V_{ref\_buck}$ to the reference value of the boost converter $V_{ref\_boost}$. The buck converter is regulating the output voltage $V_{out}$ of the DC to DC converter and provides good performance versus load in region I and region II. The boost converter is regulating the output voltage $V_{out}$ of the DC to DC converter in region III.

Figure 5:
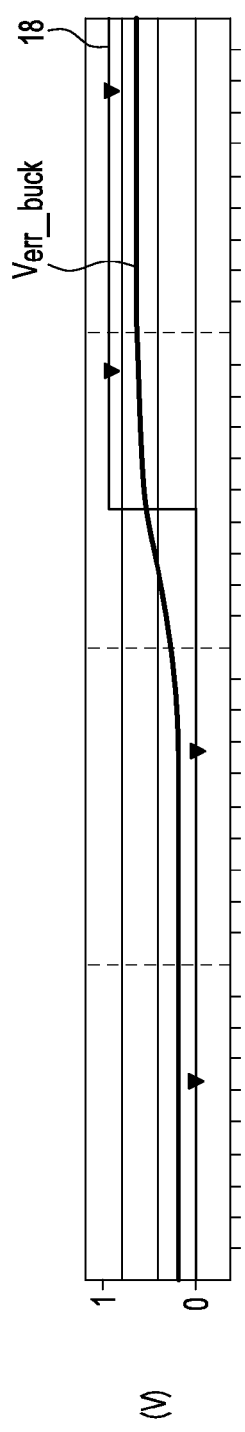
FIG. 5 schematically shows a diagram of examples of an error voltage of a buck converter $V_{err\_buck}$ and a corresponding control signal as a function of time.
Figure 6:
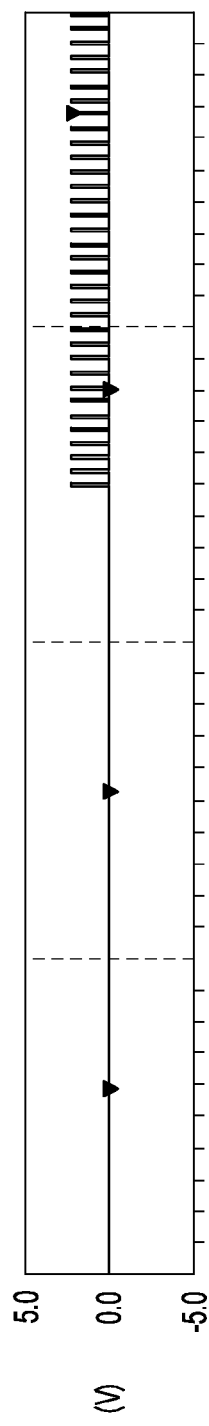
FIG. 6 schematically shows an example of an output signal of an LS control circuit as a function of time.
Figure 7:
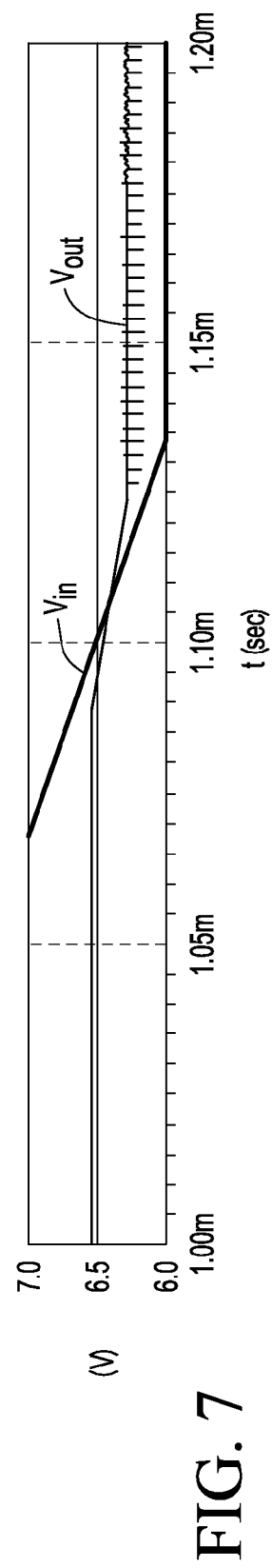
FIG. 7 schematically shows a diagram of examples of an input voltage $V_{in}$ and an output voltage $V_{out}$ of a DC to DC converter as a function of time.

Referring now to FIG. 5, a diagram of examples of an error voltage of a buck converter $V_{err\_buck}$ and a corresponding control signal 18 is shown as a function of time. FIGS. 5, 6 and 7 share a common time axis. As can be seen, at a time t between 1.1 ms and 1.15 ms, the error voltage of the buck converter $V_{err\_buck}$ may reach the threshold voltage of the buck converter $V_{out\_of\_range}$, and a value of the control signal 18 may switch from 0 to 1 volt. In the example of FIG. 5, the control signal 18 is shown as a voltage signal.

Referring now to FIG. 6, an example of an output signal of the LS control circuit is shown as a function of time. The buck converter may engage the boost converter when the control signal 18 shown in FIG. 5 switches from 0 to 1. The output signal of the LS control circuit may periodically change its value according to the second PWM signal for the boost converter. The output signal of the LS control circuit may be used directly or indirectly via a LS driver circuit as a signal for triggering the LS switching element of the boost converter. Thus, the function shown in FIG. 6 may substantially represent a PWM signal for the boost converter.

Referring now to FIG. 7, an example of an input voltage $V_{in}$ and an output voltage $V_{out}$ of a DC to DC converter is shown as a function of time. The input voltage $V_{in}$ drops from an initial value larger than 7 volt at a time t=1.00 ms to a final value smaller than 6 volt at a time t=1.20 ms. At a time t=1.10 ms, the input voltage $V_{in}$ intersects the output voltage $V_{out}$. At this time, the HS switching element of the buck converter may be permanently on, and the buck converter is no longer capable of regulating the output voltage $V_{out}$ of the DC to DC converter in the case of a further voltage drop. In consequence, the output voltage $V_{out}$ of the DC to DC converter may decrease as the input voltage $V_{in}$ of the DC to DC converter decreases. At the same time, as can be seen in FIG. 5, the error voltage of the buck converter $V_{err\_buck}$ may increase until the control signal 18 switches from 0 to 1, and the boost converter may be engaged by the buck converter. The output voltage $V_{out}$ of the DC to DC converter becomes stabilised at approximately 6.25 volt by the boost converter. The output voltage $V_{out}$ of the DC to DC converter may pulsate a little in boost mode. However, there are neither voltage nor current peaks, and the deviation of the output voltage $V_{out}$ from the reference voltage of the buck converter $V_{ref\_buck}$ or from the reference voltage of the boost converter $V_{ref\_boost}$ may be less than 5 percent. Thus, the electronic elements of the DC to DC converter and/or of the connected load may be dimensioned small because they are not exposed to unwanted peaks. In particular, transistors used as switching elements in the DC to DC converter may have a lower breakdown voltage.

Figure 8:
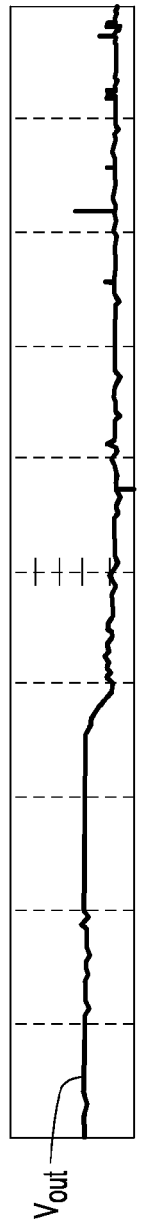
FIG. 8 shows a diagram of an example of an output voltage $V_{out}$ of a DC to DC converter as a function of time.
Figure 9:
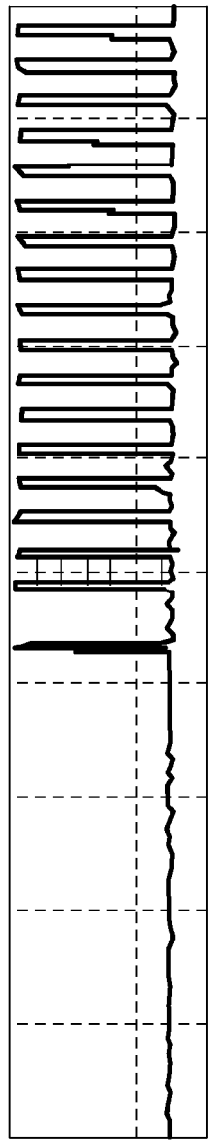
FIG. 9 shows a diagram of an example of a PWM signal of a boost converter as a function of time.
Figure 10:
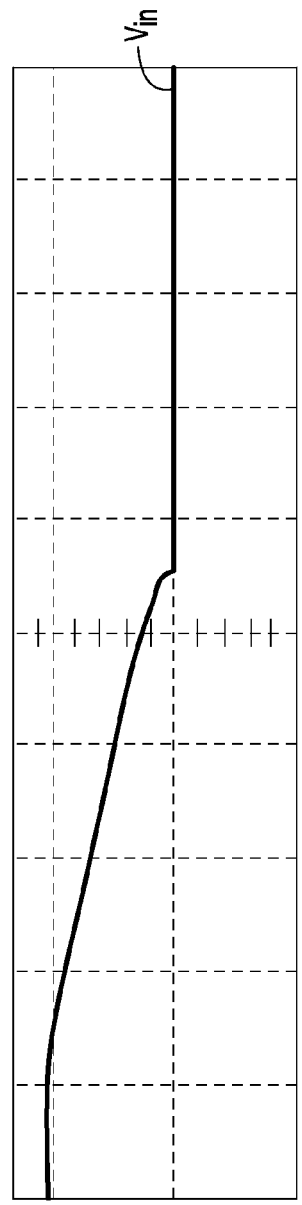
FIG. 10 shows a diagram of an example of an input voltage $V_{in}$ provided to a DC to DC converter as a function of time.

Referring now to FIGS. 8, 9, and 10 which share a common time axis, FIGS. 8 to 10 show the transition between the development of the input voltage $V_{in}$ and the corresponding output voltage $V_{out}$ of the DC to DC converter at the transition from buck mode to boost mode in more detail. As can be seen from FIG. 9, the duty-cycle of the boost converter increases with the decrease of the input voltage $V_{in}$, and the duty-cycle of the boost converter does not start with 0 percent.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on transitory or non-transitory computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

For example, the semiconductor substrate described herein can be any semiconductor material or combinations of materials, such as gallium arsenide, silicon germanium, silicon-on-insulator (SOI), silicon, monocrystalline silicon, the like, and combinations of the above.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level 0. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level 0. And if the logically true state is a logic level 0, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the first comparator, HS control circuit, and the HS driver circuit may be replaced by a single HS amplifier circuit triggering the HS switching element directly.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the buck converter, the boost converter, and the control unit may be implemented as a single circuitry. Alternatively, the examples may be implemented as any number of separate integrated circuits or separate devices interconnected with each other in a suitable manner. For example, the buck converter and the boost converter may be implemented on a single integrated circuitry and the control unit may be implemented on a different integrated circuitry.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers; notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein; are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A DC to DC converter comprising
   a buck converter;
   a boost converter; and
   a control unit,
   wherein the control unit is configured to calculate an error voltage of the buck converter Verr_buck based on a feedback output voltage Vout_FB of the DC to DC converter and a reference voltage of the buck converter Vref_buck, and
   wherein the control unit is configured to calculate an error voltage of the boost converter Verr_boost based on the feedback output voltage Vout_FB of the DC to DC converter and a reference voltage of the boost converter Vref_boost, wherein the reference voltage of the boost converter Vref_boost is shifted by an offset Voffset as compared to the reference voltage of the buck converter Vref_buck, and
   wherein the control unit is configured to calculate a control signal to engage and disengage the boost converter based on the error voltage of the buck converter Verr_buck, and
   wherein the control unit is configured to engage the boost converter when the error voltage of the buck converter Verr_buck is higher than a threshold voltage Vout_of_range, and to disengage the boost converter when the error voltage of the buck converter Verr_buck is lower than the threshold voltage Vout_of_range.

2. The DC to DC converter as claimed in claim 1, wherein the control unit is configured to provide a time-dependent sensing voltage $V_{sens}$ based on an input voltage $V_{in}$ of the DC to DC converter and a pulsating voltage $V_{puls}$, and
   wherein the control unit is further configured to provide a first PWM signal by comparing the time-dependent sensing voltage $V_{sens}$ with the error voltage of the buck converter $V_{err\_buck}$ and to provide a second PWM signal by comparing the time-dependent sensing voltage $V_{sens}$ with the error voltage of the boost converter $V_{err\_boost}$.

3. The DC to DC converter as claimed in claim 2, wherein the control unit is configured to provide the first PWM signal and a clock signal as input signals for a HS control circuit that triggers a HS driver circuit for controlling a HS switching element of the buck converter.

4. The DC to DC converter as claimed in claim 2, wherein the control unit is configured to provide the second PWM signal, a clock signal and the control signal as input signals for a LS control circuit that triggers a LS driver circuit for controlling a LS switching element of the boost converter.

5. A system on a die comprising a DC to DC converter as claimed claim 1.

6. The DC to DC converter as claimed in claim 1, wherein the control unit is configured to increase a duty cycle of the buck converter in response to an increase in the error voltage of the buck converter $V_{err\_buck}$.

7. A method to operate a DC to DC converter including a buck converter, a boost converter, and a control unit, the method comprising:
   providing, by the control unit, an error voltage of the buck converter Verr_buck based on a feedback output voltage Vout_FB of the DC to DC converter and a reference voltage of the buck converter Vref_buck;
   providing, by the control unit, an error voltage of the boost converter Verr_boost based on the feedback output voltage Vout_FB of the DC to DC converter and a reference voltage of the boost converter Vref_boost, wherein the reference voltage of the boost converter Vref_boost is shifted by an offset Voffset as compared to the reference voltage of the buck converter Vref_buck;
   calculating a control signal to engage and disengage the boost converter based on the error voltage of the buck converter Verr_buck;
   engaging, by the control unit, the boost converter when the error voltage of the buck converter Verr_buck is higher than a threshold voltage Vout_of_range; and
   disengaging, by the control unit, the boost converter when the error voltage of the buck converter Verr_buck is lower than the threshold voltage Vout_of_range.

8. The method as claimed in claim 7, further comprising:
   providing, by the control unit, a time-dependent sensing voltage $V_{sens}$ based on an input voltage $V_{in}$ of the DC to DC converter and a pulsating voltage $V_{puls}$;
   providing, by the control unit, a first PWM signal by comparing the time-dependent sensing voltage $V_{sens}$ with the error voltage of the buck converter $V_{err\_buck}$; and
   providing, by the control unit, a second PWM signal by comparing the time-dependent sensing voltage $V_{sens}$ with the error voltage of the boost converter $V_{err\_boost}$.

9. The method as claimed in claim 8, further comprising: providing the first PWM signal and a clock signal as input signals for a HS control circuit that triggers a HS driver circuit for controlling a HS switching element of the buck converter.

10. The method as claimed in claim 8, further comprising: providing the second PWM signal, a clock signal and the control signal as input signals for a LS control circuit that triggers a LS driver circuit for controlling a LS switching element of the boost converter.

11. The method as claimed in claim 7, further comprising: increasing a duty cycle of the buck converter in response to an increase in the error voltage of the buck converter $V_{err\_buck}$.

12. The method as claimed in claim 11, further comprising: increasing a duty cycle of the buck converter in response to an increase in the error voltage of the buck converter $V_{err\_buck}$.

13. A method to operate a DC to DC converter including a buck converter, a boost converter, and a control unit, the method comprising:
providing, by the control unit, an error voltage of the buck converter $V_{err\_buck}$ based on a feedback output voltage $V_{out\_FB}$ of the DC to DC converter and a reference voltage of the buck converter $V_{ref\_buck}$;
providing, by the control unit, an error voltage of the boost converter $V_{err\_boost}$ based on the feedback output voltage $V_{out\_FB}$ of the DC to DC converter and a reference voltage of the boost converter $V_{ref\_boost}$, wherein the reference voltage of the boost converter $V_{ref\_boost}$ is shifted by an offset $V_{offset}$ as compared to the reference voltage of the buck converter $V_{ref\_buck}$;
engaging, by the control unit, the boost converter when the error voltage of the buck converter $V_{err\_buck}$ is higher than a threshold voltage $V_{out\_of\_range}$; and
disengaging, by the control unit, the boost converter when the error voltage of the buck converter $V_{err\_buck}$ is lower than the threshold voltage $V_{out\_of\_range}$.

14. The method as claimed in claim 13, further comprising:
providing, by the control unit, a time-dependent sensing voltage $V_{sens}$ based on an input voltage $V_{in}$ of the DC to DC converter and a pulsating voltage $V_{puls}$;
providing, by the control unit, a first pulse width modulated (PWM) signal by comparing the time-dependent sensing voltage $V_{sens}$ with the error voltage of the buck converter $V_{err\_buck}$; and
providing, by the control unit, a second PWM signal by comparing the time-dependent sensing voltage $V_{sens}$ with the error voltage of the boost converter $V_{err\_boost}$.

15. The method as claimed in claim 14, further comprising:
providing the first PWM signal and a clock signal as input signals for a high side (HS) control circuit that triggers a HS driver circuit for controlling a HS switching element of the buck converter.

16. The method as claimed in claim 15, wherein the duty cycle of the buck converter is 100 percent before the error voltage of the buck converter $V_{err\_buck}$ is higher than the threshold voltage $V_{out\_of\_range}$, in response to a value of the threshold voltage $V_{out\_of\_range}$.

17. The method as claimed in claim 15, wherein the duty cycle of the boost converter is above 0 percent when the boost converter is engaged in response to a value of the error voltage of the boost converter $V_{err\_boost}$.

18. The method as claimed in claim 14, further comprising:
providing the second PWM signal, a clock signal and the control signal as input signals for a low side (LS) control circuit that triggers a LS driver circuit for controlling a LS switching element of the boost converter.

* * * * *